No. 729,459. PATENTED MAY 26, 1903.
C. J. WALZ.
DISINFECTING APPARATUS.
APPLICATION FILED NOV. 10, 1900.
NO MODEL.

Witnesses:-
George Barry Jr
Henry Thieme

Inventor:-
Charles J. Walz
by attorneys

No. 729,459. Patented May 26, 1903.

UNITED STATES PATENT OFFICE.

CHARLES J. WALZ, OF NEW YORK, N. Y., ASSIGNOR TO THE WEST DISINFECTING COMPANY, OF NEW YORK, N. Y., A CORPORATION OF NEW YORK.

DISINFECTING APPARATUS.

SPECIFICATION forming part of Letters Patent No. 729,459, dated May 26, 1903.

Application filed November 10, 1900. Serial No. 36,078. (No model.)

*To all whom it may concern:*

Be it known that I, CHARLES J. WALZ, a citizen of the United States, and a resident of the borough of Manhattan, in the city and State of New York, have invented a new and useful Improvement in Disinfecting Apparatus, of which the following is a specification.

My invention relates to an improvement in disinfecting apparatus, with the object in view of providing a cut-off for the liquid-discharge tube of the reservoir or tank, whereby the said tube may be closed when it is desired to pour more liquid into the reservoir or tank.

A further object is to provide an automatic cut-off for the said discharge-tube whereby the tube is automatically closed when the filling-cap of the tank is removed and which will be opened as the filling-cap is inserted into its position to close the top of the tank.

A practical embodiment of my invention is represented in the accompanying drawings, in which—

Figure 1:
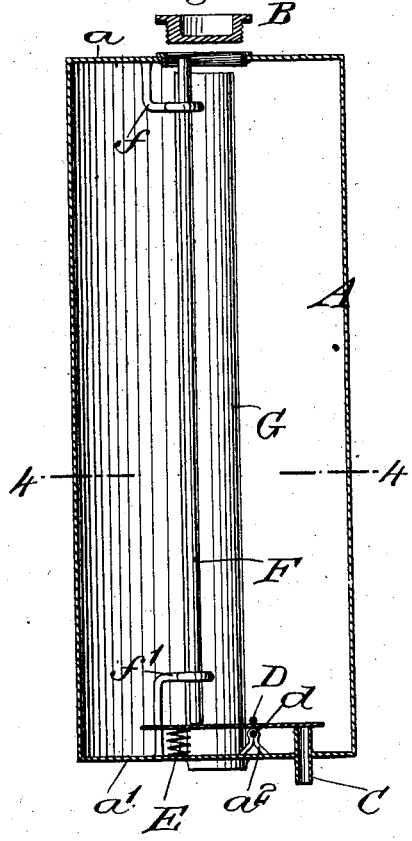
Figure 2:
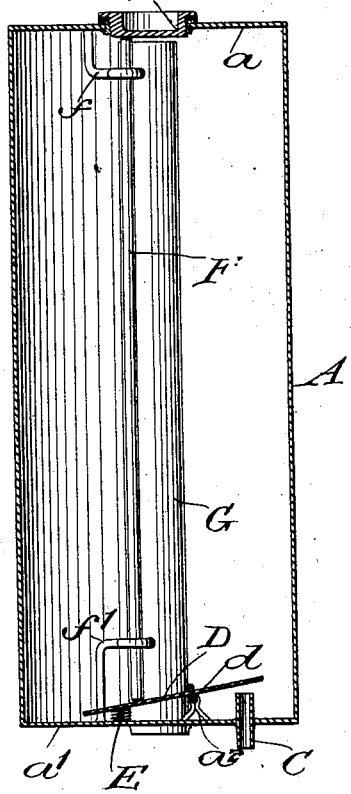
Figure 3:
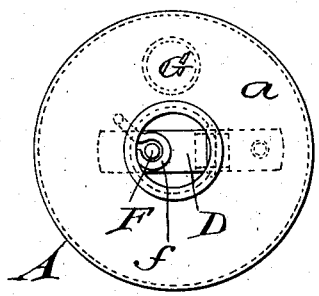
Figure 4:
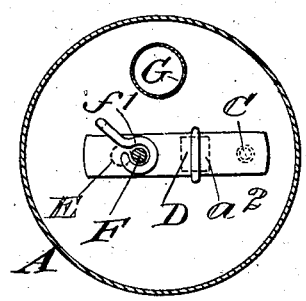

Figure 1 represents a vertical central section through the reservoir or tank, showing the position which the parts assume when the filling-cap is removed. Fig. 2 is a similar view showing the position of the parts when the filling-cap is inserted into its position in the top of the tank. Fig. 3 is a top plan view of the tank with the filling-cap removed, and Fig. 4 is a transverse section taken in the plane of the line 4 4 of Fig. 1.

I have shown in the accompanying drawings only so much of the disinfecting apparatus as will give a clear understanding of the construction and operation of the cut-off.

The reservoir or tank for the disinfecting liquid is denoted by A, and it may be made of any desired shape and size, that shown in the accompanying drawings being of oblong cylindrical form. The top $a$ of the tank is provided with a removable filling-cap B, which has a screw-threaded engagement with the said top.

The bottom of the tank or reservoir A is denoted by $a'$, and a short liquid-discharge tube C passes therethrough, the top and bottom of the said tube being a short distance above and below the bottom $a'$ of the said tank.

The means which I employ for cutting off the flow of liquid through the discharge-tube C, when so desired, is as follows: A spring-actuated cut-off valve D is hinged at $d$ upon a suitable support $a^2$, uprising from the bottom $a'$ of the tank. One arm of the said valve D is arranged in position to open and close the top of the tube C. The valve D is spring-actuated, so that it normally closes the discharge-tube C, the particular device shown in the accompanying drawings being a coil-spring E, which is interposed between the bottom of the tank and the opposite arm of the valve from that which opens and closes the said discharge-tube C. The valve D is under the control of the filling-cap B, by means of a vertically-disposed operating bar or rod F, the lower end of which rests in engagement with the valve D and the other end of which is held in position to be engaged and depressed by the filling-cap B as the cap is screwed into its position to close the tank. Upper and lower guide-brackets $ff'$ serve to loosely retain the rod F in its position. The strength of the spring E is sufficient to raise the rod F and close the valve D when the pressure is removed from the top of the rod F by the unscrewing and removal of the filling-cap B.

The tank A may be provided with the usual air-tube G, which extends upwardly from the bottom $a'$ to a point in proximity to the top $a$ of the tank.

From the above description it will be seen that disinfecting liquid may be poured into the tank at any time, whether the tank be emptied or not, as the moment the filling-cap B is removed the discharge-tube is closed. This is a very important point, and it will furthermore be seen that the person who fills the tank must necessarily open the valve as he screws the filling-cap into its position to close the top of the tank.

It is evident that other forms of cut-off than that shown herein might be employed without departing from the spirit and scope of my invention. Hence I do not wish to limit myself strictly to the structure herein shown and described; but

What I claim is—

Disinfecting apparatus comprising a tank or reservoir, an air-tube opening through the bottom of the reservoir and extending upwardly within the reservior to a point above the level which the liquid is intended to occupy within the reservoir, a discharge-tube extending through the bottom of the reservoir with its lower end below the bottom of the reservoir and its upper end within the reservoir above the bottom of the reservoir, a valve mounted to rock toward and away from the upper end of the tube within the reservoir, a spring having a tendency to hold the valve closed, a valve-operating rod arranged to work the valve in a direction opposed to the tension of the spring, the said valve extending to the top of the reservoir and a removable filling-cap fitted to the top of the reservoir in position to operate the valve-rod and hence the valve to open the valve when the filling-cap is adjusted, substantially as set forth.

In testimony that I claim the foregoing as my invention I have signed my name, in presence of two witnesses, this 24th day of October, 1900.

CHARLES J. WALZ.

Witnesses:
FREDK. HAYNES,
GEORGE BARRY, Jr.